3,154,248
Patented Oct. 27, 1964

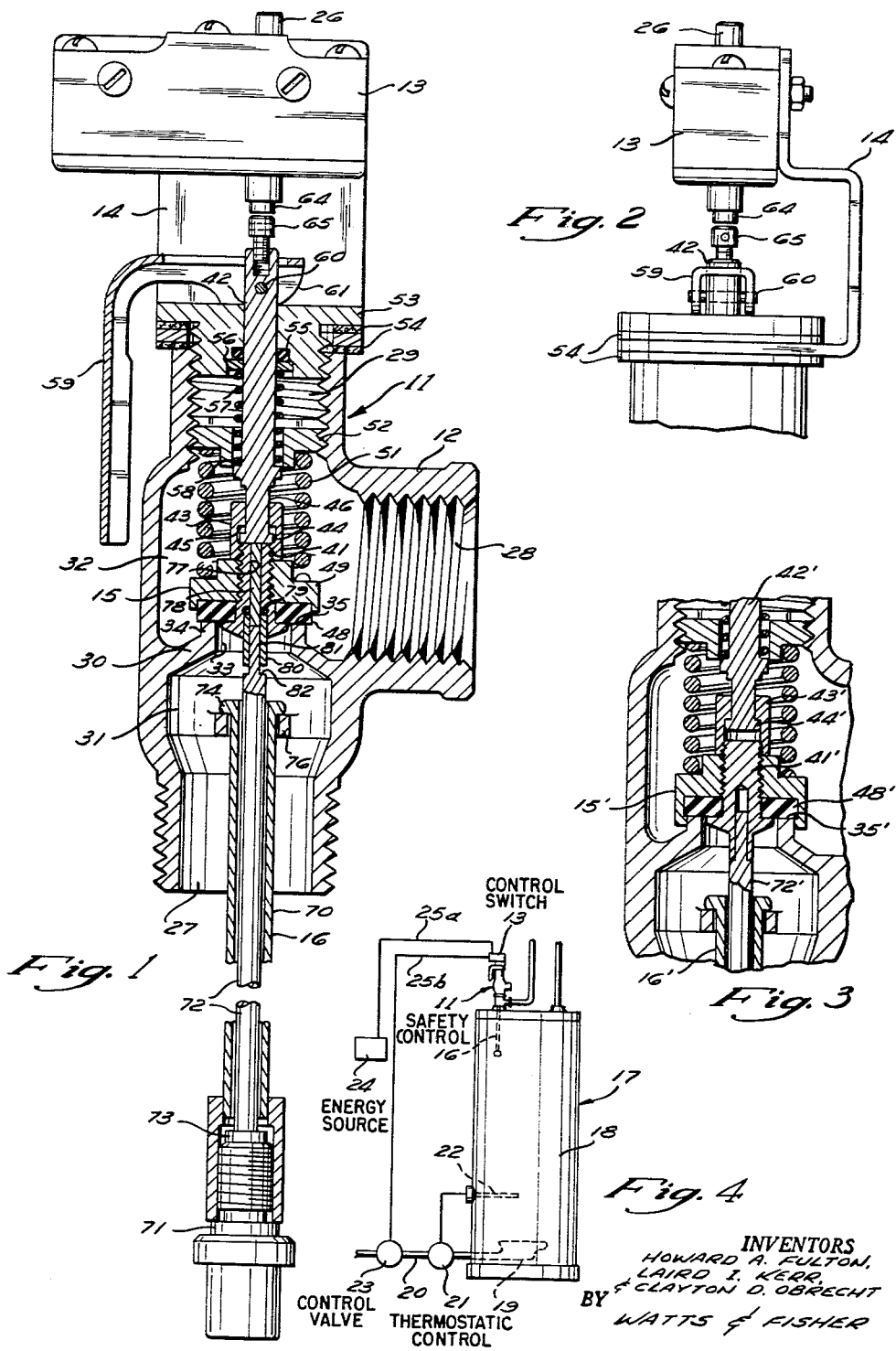

United States Patent Office 3,154,248
TEMPERATURE CONTROL RELIEF VALVE
Howard Anthony Fulton, Perrysville, Laird Irwin Kerr, Big Prairie, and Clayton Duane Obrecht, Loudonville, Ohio, assignors to Mansfield Sanitary, Inc., Big Prairie, Ohio
Filed Jan. 16, 1963, Ser. No. 251,877
21 Claims. (Cl. 236—21)

The present invention relates generally to valves and more particularly to safety valves for use with hot water tanks.

In water tanks it is customary to provide a pressure relief valve for primary protection against the dangers inherent in an overheated tank. While relief valves are adequate for many over-heating situations, a material lack in prior hot water tank arrangements has been the lack of secondary, or back-up, protection for the tank for cases where the primary protection is inadequate for proper relief of an overheated condition of the tank caused, for example, by malfunctioning of the tank thermostat. Where the escape of hot water and steam through the relief valve is not adequate to relieve the overheating, the heat source should be shut off in order to prevent several possible undesirable occurrences caused by further escape of steam and hot water. These occurrences include:

(1) The relief valve may be weakened or otherwise damaged by being maintained in an open condition for a protracted period of time;

(2) The escaping steam is dangerous to personnel, destructive to property and wasteful of fuel; and, (3) The pressure may, in spite of the relief valve, build to a dangerous level.

In some instances there may not be any primary protection by pressure relief as where the valve fluid passage is blocked or the valve mechanism is rendered inoperative by some foreign element. Often the foreign element is an accumulation of corrosion during the valve's long periods of inactivity, especially where the valve and connected pipes are of dissimilar metals. In these cases it is imperative that some back-up protection be provided.

In some applications it is desirable that the primary protection not be pressure relief, especially where the tank is in or directly adjacent the inhabited portions of a building. Here, in the event of overheating, it is more desirable that the heat source be shut off as primary protection and the relief valve open only in the event back-up protection is needed.

The present invention provides a safety control which provides primary and secondary protection by controlling the heat source and providing pressure relief in a predetermined sequential relation. In one form of the present safety control the pressure relief is primary protection and the heat source control is secondary protection. In another form the heat source control is primary protection and the pressure relief is secondary protection. In both forms of the present safety control, the primary and secondary sequential relation of the two protections provided is assured and not probable. Moreover, the safety control is simple in construction and a relatively low cost item.

In a preferred form the present safety control includes a valve and a valve closure member normally urged against a valve seat to stop fluid flow through the valve, an excess temperature responsive actuator operatively connected to the valve closure member and adapted to move it away from the valve seat, and an electrical switch having an actuator operatively connected to the valve closure member and the temperature responsive actuator to control a heat source. This heat source control may be in one of at least two relationships to the opening movement of the valve closure member depending upon the particular application. In the first form of the safety control the temperature responsive actuator moves the valve closure member before the switch actuator is moved. This safety control permits some of the hot water and steam to escape to relieve the heat condition and shuts off the heat source only if the condition persists. In the second form of the safety control the temperature responsive actuator moves the electric switch actuator prior to moving the closure member. This latter safety control attempts to relieve the heat condition by shutting off the heat source so that the valve closure member is only opened if the heat condition persists after the heat source is shut off.

Accordingly, one feature of the present invention is the provision of a safety control utilizing a relief valve and an electrical switch combined to provide heat source control in addition to tank pressure relief.

Another feature of the present invention is the provision of a safety control providing primary protection and secondary back up protection by heat source and tank pressure controls.

Still another feature of the present invention is the provision of a safety control which provides primary and secondary protection in an assured sequential relation.

Yet another feature of the present invention is the provision of a safety control including a relief valve which provides heat source control in the event the relief valve is inoperative, plugged or otherwise unable to provide pressure relief.

Other features and a fuller understanding of the invention may be had by referring to the following description and claims taken in conjunction with the accompanying drawing in which:

FIGURE 1 is a longitudinal view, substantially in cross section, of the safety control of the present invention;

FIGURE 2 is a front, fragmentary view, of the safety control of FIGURE 1;

FIGURE 3 is a fragmentary view, in cross section, of an alternate form of the safety control of FIGURE 1; and, FIGURE 4 is a schematic diagram of a fluid heater control system using the safety control of the present invention.

Referring now to the drawing, wherein like reference characters designate like or corresponding parts throughout the several views, a safety contol and valve unit is designated generally by the reference character 11. The safety control 11 includes a relief valve 12, a control switch 13, and a bracket 14 mounting the switch 13 on the relief valve 12. The relief valve 12 includes a stem and washer assembly 15 which controls the flow of fluid through the valve 12. A thermal actuator assembly 16 is attached to the relief valve 12 and cooperates with the stem and washer assembly 15 and the control switch 13 to open the valve and actuate the control switch in a predetermined sequence upon the occurrence of an excess temperature condition. The sequence of operation of the stem and washer assembly 15, the thermal actuator assembly 16, and the switch 13 is such as to provide primary protection to relieve the excess temperature condition and secondary, back-up protection in the event the primary protection does not relieve the temperature condition.

A conventional hot water heater unit 17 utilizing the present safety control unit 11 is shown in FIGURE 4. The heater unit 17 includes a tank 18 and a burner plate or heating element 19 which provides a source of heat to raise the water temperature in the tank 18. A pipe or line 20 supplies fuel to the heating element 19. A conventional thermostatic control unit 21 controls the fuel flow in the pipe in response to the water temperature as detected by a temperature sensitive element 22. The safety control unit 11 is mounted in the straight-through openings of a T connected in the hot water outlet of the tank 18. The thermal actuator assembly 16 extends into the tank cavity. A fuel control valve 23 is interposed in the fuel line 20 to also control fuel flow to the heating element 19. The fuel control valve 23 is normally closed and opens when energized by an energy source 24 via the conductors 25a, 25b. The heat source control switch 13 is interposed between the conductors 25a, 25b to control energization of the fuel control valve 23. Contacts (not shown) in the control switch 13 are normally closed to energize the fuel control valve 23 from the energy source 24. When the control switch contacts are opened by the relief valve 12, the energizing circuit to the fuel control valve 23 is broken and the flow of fuel to the heating element 19 is shut off. If the excess pressure and/or temperature condition passes, the control valve can be energized by pushing a reset button 26 on the control switch 13.

In the safety control arrangement shown in FIGURE 1 the thermal actuator assembly 16, the stem and washer assembly 15, and the control switch 13 cooperate such that the switch 13 is actuated before the stem assembly 15 permits fluid to flow through the relief valve 12. This arrangement permits the heating element 19 to be shut off to relieve the temperature conditions within the water tank so that the relief valve opens only under extreme conditions which were not relieved by shutting off the source of heat. In the alternate form of the safety control shown in FIGURE 3, the actuator assembly 16', the stem and washer assembly 15', and the control switch cooperate such that the relief valve opens to permit the discharge or hot water and/or steam from the water tank before the control switch is actuated. This form of the safety control is used in applications wherein it is believed that a small release of the tank pressure will alleviate the high temperature and pressure condition such that the control switch is actuated to shut off the heat source only when the extreme condition persists. The construction of the alternate control of FIGURE 3 is described in greater detail below.

Referring again to FIGURE 1, the relief valve 12 includes a valve body whose internal surfaces define an inlet port 27, an outlet port 28, a valve stem opening 29, and a central cavity providing communication among the ports 27, 28 and the opening 29. A partition wall 30 divides the central cavity into an inlet chamber 31 and a substantially larger discharge chamber 32. The partition wall 30 includes a central fluid opening 33 which provides fluid passage between the chambers 31, 32. The fluid opening 33 is defined in part by an axially extending portion 34 of the partition wall 30. As viewed in FIGURE 1 the uppermost surface of the axially extending portion 34 defines a valve seat surface 35. The stem and washer assembly 15 reciprocates within the discharge chamber 32 and the stem opening 29 in the manner of a piston to selectively control the passage of fluid through the fluid opening 33.

As taken from the vertical position of the safety control shown in the drawing, the stem assembly 15 includes a lower stem member 41, an upper stem member 42, and a hex nut coupling 43 connecting the stem members in a lost motion relation. A lower portion of the upper stem member 42 includes a necked or reduced portion 46 swivelly journaled in the coupling 43, and a stem head 44. The stem head 44 is normally spaced from an internal shoulder 45 of the coupling 43 and abuts the top of the lower stem member 41. The stem head 44 is movable within the coupling 43 between the limits prescribed by the shoulder 45 and the lower stem member 41.

The stem and washer assembly 15 includes a resilient washer 48 which acts as a closure member for the fluid opening 33. A washer retaining member 49 threads onto the lower stem member 41 to maintain the washer 48 and the stem 41 in an assembled relation.

A closure member return spring 51 is provided around the stem assembly 15 to bias it to a normally closed position where the valve washer 48 abuts the seat surface 35. A spring stop and screw member 52 threads inside the stem assembly opening 29 to place the return spring 51 in compression and to provide a means of adjusting the pressure of the washer 48 against the seat 35. Thus, the screw member 52 provides a means of adjusting the release pressure of the washer 48. A cap member 53 threads into the stem opening 29 to enclose the interior of the relief valve 12 and rigidly secure the switch bracket 14 to the relief valve 12. Fiber gaskets 54 are sandwiched on each side of the switch bracket 14 to assure a seal between the cap 53, the bracket 14, and the relief valve 12.

The cap member 53 includes an O-ring 55 around the upper stem member 42 to maintain a fluid seal in this portion of the relief valve 12. A washer 56 retains the O-ring in a groove within the cap member 53. A stem return spring 57 is disposed around the upper stem member 42 and between the washer 56 and a shoulder 58 on the stem member 42 to normally bias it into juxta-position against the top of the lower stem member 41.

The upper stem member 42 extends through central openings in the screw and cap members 52, 53 respectively, and protrudes a short distance beyond the cap member 53. A cam lever 59 is pivotally secured to the protruding portion of the upper stem member 42 by a removable pin 60. The cam lever 59 includes a camming surface 61 which engages the top surface of the cap member 53 and longitudinally withdraws the stem assembly from the interior of the valve 12 as the cam lever is rotated clockwise as viewed in FIGURE 1. As the upper stem member 42 is withdrawn, the stem head 44 travels within the swivel coupling 43 until the head 44 engages the internal shoulder 45. At the moment the stem head 44 engages the internal shoulder 45 the swivel member 44 lifts or moves the washer 48 away from its abutting or adjacent position on the seating surface to a spaced position wherein fluid is allowed to pass from the inlet chamber 31 to the discharge chamber 32.

As described above the control switch 13 includes normally closed contacts (not shown) which are connected in series with conductors 25a, 25b forming the energizing circuit for the fuel control valve 23. The control switch 13 includes an actuator bar 64 to move the contacts from their normally closed position to an open position breaking the energizing circuit to the fuel control valve. Inward movement of the actuator bar 64 relative to the switch 13 operates the contacts to their open position. The manual re-set button 26 is provided to return the contacts to their closed position once the excess temperature and/or pressure condition has been removed. The actuator bar 64 is disposed above an adjusting screw 65 which threads into the upper half of the upper stem member 42. About .001 inch clearance is normally provided between the actuator bar 64 and the top of the adjusting screw 65.

The thermal actuator assembly 16 includes an extended tubular member 70, a thermal actuator element 71 secured to one end of the tubular member 70, and an actuator rod 72 disposed within the extended tubular member 70 and abutting against the thermal actuator element 71. As viewed in the drawing, an upper end of the extended tubular member extends through the inlet port 27 into the inlet chamber 31. A shoulder 74 is formed at the upper end of the tubular member 70 and rests on a support 76 to fix the thermal actuator assembly 16 relative to the valve 12 and the switch 13. The support 76 extends between the walls of the inlet cavity to bridge the inlet port and is preferably a part of the casting making up the body of the relief valve.

The thermal actuator element 71 is sensitive to a predetermined temperature change in fluid conditions within the water tank and includes a material which expands upon such predetermined temperature change to drive a small actuator pin 73 upward out of the actuator element. The actuator rod 72 abuts the small actuator pin 73 and is driven upwardly relative to the extended tubular member 70 by the pin 73. A lost motion connection is provided between the actuator rod 72 and the lower stem member 41 so that initial upward movement of the actuator rod moves the upper stem member 42 but not the lower stem member 41. To provide this lost motion between the actuator rod 72 and the lower stem member 41, an axially extending opening 77 is provided in the lower stem member 41. A lost motion pin 78 is slidably disposed within the axially extending opening 77. An O-ring 79 is provided around the pin to maintain a seal at the beginning of the axially extending opening 77. The lost motion pin 78 abuts the actuators pin 72 at one end and the head 44 of the upper stem member 42 at its other end. A cylindrical sleeve 80 is disposed in an enlarged portion of the axially extending opening 77. An uppermost end 81 of the actuator rod 72 is reduced in diameter to fit within the interior of the cylindrical sleeve 80 and abuts the lost motion pin 78.

the initial upward movement of the actuator rod 72 causes upward movement of the lost motion pin 78 within the lower stem member 41 to thus move the upper stem member 42 and consequently the actuator bar of the control switch 13. The switch contacts within the switch 13 open and cause the fuel control valve 23 to close shutting off the supply of fuel to the heat source. If the condition is extreme or persists despite the absence of the heat source the actuator rod 72 continues its upward movement until either a shoulder 82 formed by the reduced end 81 abuts against the lower end of the cylindrical sleeve 80, and/or the stem head 44 abuts the coupling shoulder 45. Further movement of the actuator rod 72 lifts the washer 48 off the seating surface 35 to permit fluid to flow from the inlet chamber 31 to the discharge chamber 32 and thereby assures relief of the pressure conditions within the hot water tank 18.

In the alternate form of the control shown in FIGURE 3, the relief valve 12 does not include a lost motion pin. The actuator rod 72' directly abuts the lower stem member 41'. In addition the stem head 44' of the upper stem member 42' is in normally spaced relation to the top of the lower stem member 41' within the coupling 43'. Initial upward movement of the actuator rod 72' in response to a predetermined temperature condition as sensed by the thermal actuator element immediately lifts the washer 48' from the seat 35' to allow fluid to flow from the inlet chamber and to the discharge chamber. If the fluid condition persists, further upward movement of the actuator rod 72' causes the lower stem member 41' to engage the upper stem member 42' to actuate the switch 13, thereby shutting off the fuel supply to the heat source.

Briefly stated, the present invention is believed to comprise essentially a safety control unit for use with a fluid heater to provide pressure relief and heat source control in addition to the conventional thermostatic control of the heat source, the safety control unit including a valve having inlet and outlet openings and a closure member movably mounted within the valve to control fluid flow between the openings, the closure member including first and second stem portions coupled together for relative movement between fixed limits, a heat source control switch member fixed to the valve and including a contact actuator operatively connected to the first stem portion, and a thermal actuator fixed to the relief valve and including an actuator rod connected to at least one stem portion whereby one stem portion moves with said actuator rod relative to the other stem portion during the initial movement of the actuator rod to actuate one of the members, and the stem portions move together during further actuator rod movement to actuate the other of the members.

We claim:
1. In combination with a fluid heating tank having a supply line supplying energy to a heating element and a thermostatic control in the supply line to control the supply of energy to the heating element, a safety control for providing tank pressure relief and additional supply control, said safety control comprising:
   (a) a pressure relief valve having inlet and outlet openings and a closure member movable within the relief valve to control the flow of fluid between said openings, said relief valve inlet opening being connected to a relief opening in the tank;
   (b) condition responsive means connected to said closure member and responsive to a predetermined fluid condition within said tank to move said closure member to permit fluid flow through said valve;
   (c) a supply line control fixed to said relief valve;
   (d) means connecting said supply line control to the supply line to control the energy supplied to the heating element; and,
   (e) means connecting said supply line control to said condition responsive means whereby control of the energy supplied to the heating element is in a predetermined sequential relation to opening movement of said closure member.

2. A safety control for a hot water tank comprising:
   (a) a valve having inlet and outlet openings and a closure member movably mounted within the valve to control fluid flow between the openings;
   (b) a valve stem connected to said closure member and extending through a stem opening in said valve body;
   (c) an electrical switch secured to said valve body and including a contact actuator operatively associated with said valve stem;
   (d) a thermal actuator secured to the valve body within said inlet chamber; and,
   (e) said thermal actuator including an actuator rod engaging said stem and operative in response to a predetermined heat condition to move said stem relative to said body thereby actuating said electric switch.

3. The device of claim 2 wherein said contact actuator, said stem, and actuator rod are all in axial alignment.

4. A safety control comprising:
   (a) a valve having inlet and outlet openings and a closure member movably mounted within the valve to control fluid flow between the openings;
   (b) said closure member including first and second stem members;
   (c) means coupling said stem members in a lost motion relation for relative movement between fixed limits;
   (d) a heat source control switch fixed to the valve and including a contact actuator operatively connected to the first stem member;
   (e) a thermal responsive actuator fixed to the relief valve and including an actuator rod adapted to move relative to the valve in response to a predetermined heat condition; and,
   (f) said actuator rod being connected to at least one stem member whereby said one stem member moves with said actuator rod relative to the other stem member within said fixed limits during the initial portions of the actuator rod movement and said stem members move together for the remaining portion of said actuator rod movement.

5. The device of claim 4 wherein said closure member includes a valve washer being connected to the second stem member and cooperating with a valve seat to control the flow of water between said openings, and the actuator rod is connected to said first stem member to cause said first stem member to move with said actuator rod relative to the second stem member during the initial actuator rod movement.

6. The device of claim 4 wherein said closure member includes a valve washer being connected to the second stem member and cooperating with a valve seat to control the flow of water between said openings, and the actuator rod is connected to said second stem member to cause said second stem member to move with said actuator rod relative to the first stem member during the initial actuator rod movement.

7. A control comprising:
  (a) a valve body having inlet and discharge chambers, a fluid opening providing communication between said chambers, and an inlet and an outlet providing ingress and egress to said inlet and discharge chambers respectively;
  (b) a closure member disposed in said valve body and movable between a first position closing said fluid opening and a second position away from said opening permitting fluid to pass through said opening;
  (c) means urging said closure member to the first position;
  (d) a thermal actuator fixed to said valve body within said inlet chamber and including an actuator member which moves relative to said valve body upon a heat condition;
  (e) a stem member slidably disposed in a stem opening in said valve body;
  (f) said stem member having one end adjacent said closure member and the other end extending outside said valve body, said stem member including means external of the body for activating a mechanism;
  (g) means operatively interposed between said actuator member and said stem member and engaging both members so that movement of said actuator member moves said stem member; and,
  (h) means providing a lost motion connection between said closure member and at least one of the other members whereby a predetermined heat causes said actuator member to move said stem member a predetermined distance for actuating a mechanism before said one other member moves said closure member away from said fluid opening.

8. A control comprising:
  (a) a valve body having inlet and discharge chambers, a fluid opening providing communication between said chambers, and an inlet and an outlet providing ingress and egress to said inlet and discharge chambers respectively;
  (b) upper and lower stem members disposed in said valve body;
  (c) said lower stem member including a closure portion movable between a first position closing said fluid opening and a second position away from said opening permitting fluid to pass through said opening;
  (d) means urging said closure portion to the first position;
  (e) a thermal actuator fixed to said valve body within said inlet chamber and including an actuator member which moves relative to said valve body upon a predetermined heat condition;
  (f) said upper stem member being slidably disposed in a stem opening in said valve body;
  (g) said upper stem member having one end adjacent said lower stem member and the other end extending outside said valve body, said upper stem member including means external of the body for actuating a mechanism;
  (h) said actuator member being operatively engageable with said upper stem member; and,
  (i) means providing a lost motion connection between said lower stem member and at least one of said other members so that in the event of a predetermined heat condition said actuator member moves said upper stem member a predetermined distance for actuating a mechanism before said closure portion is moved away from said fluid opening.

9. The control of claim 8 wherein said actuator member and said stem members are axially coextensive.

10. The control of claim 9 wherein said lost motion connection includes said lower stem member having an axial bore, a lost motion pin in said bore and extending between said upper stem member and said actuator member, and a shoulder on said actuator member engageable with said lower stem member after moving said lost motion pin a predetermined distance relative to said lower stem member.

11. The control of claim 10 wherein said lost motion connection includes said lower stem member having an axial bore, a lost motion pin in said bore and extending between said upper stem member and said actuator member, a coupling member having one end fixed to one of said stem members and the other end connected to the other of said stem members for relative movement between fixed limits, and said coupling member other end and said other stem member having portions mutually engaging when said stem members move axially away from one another a predetermined distance whereby said lower stem member moves with said upper stem member after said lost motion pin, as moved by said actuator member, has moved said upper stem member said predetermined distance.

12. The control of claim 8 including, in combination:
  (j) an electric switch having a housing fixed to said valve body;
  (k) said electric switch having electrical contacts and a contact actuator operatively associated with said upper stem member whereby movement of said upper stem member for said predetermined distance moves said contact actuator to operate said contacts before said closure member is moved away from said fluid opening.

13. The control of claim 10 including, in combination:
  (j) an electric switch having a housing fixed to said valve body;
  (k) said electric switch having electrical contacts and a contact actuator operatively associated with said upper stem member whereby movement of said upper stem member for said predetermined distance moves said contact actuator to operate said contacts before said closure member is moved away from said fluid opening.

14. The control of claim 11 including, in combination:
  (j) an electric switch having a housing fixed to said valve body;
  (k) said electric switch having electrical contacts and a contact actuator operatively associated with said upper stem member whereby movement of said upper stem member for said predetermined distance moves said contact actuator to operate said contacts before said closure member is moved away from said fluid opening.

15. The combination of claim 13 wherein said contact actuator is axially coextensive with said stem members.

16. The combination of claim 14 wherein said contact actuator is axially coextensive with said stem members.

17. A control comprising:
  (a) a valve body having inlet and discharge chambers, a fluid opening providing communication between said chambers, and an inlet and an outlet providing ingress and egress to said inlet and discharge chambers respectively;
  (b) upper and lower stem members disposed in said valve body;
  (c) said lower stem member including a closure portion movable between a first position closing said fluid opening and a second position away from said opening permitting fluid to pass through said opening;

(d) means urging said closure portion to the first position;

(e) a thermal actuator fixed to said valve body within said inlet and including an actuator member which moves relative to said valve body upon a predetermined heat condition;

(f) said upper stem member slidably disposed in a stem opening in said valve body;

(g) said upper stem member having one end spaced from said lower stem member and the other end extending outside said valve body;

(h) said actuator member being engageable with said lower stem member to move said lower stem member in the event of a heat condition whereby said closure portion is moved away from said fluid opening before said lower stem member engages said upper stem member;

(i) an electric switch having a housing fixed to said valve body; and, (j) said electric switch having electrical contacts and a contact actuator operatively associated with said upper stem member, and movement of said upper stem member moving said contact actuator whereby initial movement of said lower stem member moves said closure portion away from said fluid opening and further movement of said lower stem member moves said closure portion and said contact actuator to operate said contacts.

18. The combination of claim 17 including, in combination:

(k) said stem members in their end spaced relation including abutting portions whereby outward axial movement of said upper stem member also moves said lower stem member thereby moving said closure member away from said closure opening.

19. In combination with a fluid heating tank having a thermostat-controlled heating element energizing circuit, a safety control comprising:

(a) a pressure relief valve having inlet and outlet openings and a closure member movable within the relief valve to control the flow of fluid between said openings, said relief valve inlet opening being connected to a relief opening in the tank;

(b) condition responsive means connected to said closure member and responsive to a predetermined fluid condition within said tank to move said closure member to permit fluid flow through said valve;

(c) an electrical switch fixed to said relief valve, said electrical switch including electrical contacts connected in said energizing circuit to control energization of said heating element in addition to control by the thermostat control, said electrical switch including an actuator to actuate said contacts; and, (d) means operatively connecting said actuator to said condition responsive means to cause actuation of said contacts in a predetermined sequential relation to the opening movement of said closure member in response to a predetermined condition in said tank.

20. In a hot water heater including a storage tank having a relief opening, and a heat source connected to an electric heat control switch which when energized causes heat to be applied to fluid in the tank, the combination of an automatic control for controlling fluid conditions within the tank by opening and closing said relief opening and by controlling the application of heat from the heat source through electrical energization and de-energization of the heat control switch, said control comprising:

(a) a valve body having:
　(i) an internal cavity,
　(ii) inlet and outlet ports proving ingress and egress to said cavity, and
　(iii) means partitioning said cavity into inlet and discharge chambers, said partitioning means having a fluid control opening to provide controlled fluid passage between said chambers;

(b) a closure member movable between engaging and spaced positions relative to said fluid control opening to close and open said opening;

(c) means yieldably urging said closure member to said engaging position so as to normally close said fluid control opening;

(d) a condition responsive element having:
　(i) an outer portion fixed to said valve body, and
　(ii) an actuator rod movable relative to said outer fixed portion in response to a predetermined change in fluid conditions and engageable with said closure member to move said closure member toward said spaced position;

(e) a stem assembly including:
　(i) a lower stem member fixed to said closure member, and
　(ii) an upper stem member extending out through a stem opening in said valve body;

(f) an auxiliary control switch for controlling energization and de-energization of the heat control switch, said auxiliary switch being fixed to said valve body and including a switch actuator engageable by said upper stem member;

(g) means operatively connecting the actuator rod of said condition responsive element to said upper stem member; and, (h) said latter means moving said upper stem member a predetermined distance relative to said closure member before said actuator rod engages said closure member to provide a lost motion connection so that said actuator rod moves in response to a predetermined fluid condition to first cause actuation of said auxiliary switch and afterward move said closure member toward said spaced position.

21. In a hot water heater including a storage tank having a relief opening, and a heat source connected to an electric heat control switch which when energized causes heat to be applied to fluid in the tank, the combination of a safety control for controlling fluid conditions within the tank by opening and closing said relief opening and by controlling the application of heat from the heat source through electrical energization and de-energization of the heat control switch, said safety control comprising:

(a) a valve body having:
　(i) an internal cavity,
　(ii) inlet and outlet ports proving ingress and egress to said cavity, and
　(iii) means partitioning said cavity into inlet and discharge chambers, said partitioning means having a fluid control opening to provide controlled fluid passage between said chambers;

(b) a closure member movable between engaging and spaced positions relative to said fluid control opening to close and open said opening;

(c) means yieldably urging said closure member to said engaging position so as to normally close said fluid control opening;

(d) a condition responsive element having:
　(i) an outer portion fixed to said valve body; and
　(ii) an actuator rod movable relative to said outer fixed portion in response to a predetermined change in fluid conditions and engageable with said closure member to move said closure member toward said spaced position;

(e) a stem assembly including:
　(i) a lower stem member fixed to said closure member, and
　(ii) an upper stem member extending out through a stem opening said valve body;

(f) an auxiliary control switch for controlling energization and de-energization of the heat control switch, said auxiliary switch being fixed to said valve body and including a control actuator engageable by said upper stem member; and, (g) said upper and lower stem members being in spaced relation whereby said actuator rod moves in response to a predetermined fluid condition to first move said closure member toward said spaced position before causing actuation of said auxiliary switch.

References Cited in the file of this patent

UNITED STATES PATENTS

| | | |
|---|---|---|
| 2,497,201 | Banner | Feb. 14, 1950 |
| 2,806,455 | Birkemeier | Sept. 17, 1957 |
| 3,055,589 | Work | Sept. 25, 1962 |

UNITED STATES PATENT OFFICE
CERTIFICATE OF CORRECTION

Patent No. 3,154,248                          October 27, 1964

Howard Anthony Fulton et al.

It is hereby certified that error appears in the above numbered patent requiring correction and that the said Letters Patent should read as corrected below.

Column 1, line 38, for "Ofter" read -- Often --; column 3, line 33, for "or", first occurrence, read -- of --; column 5, after line 21, insert the following as the beginning of a new paragraph:
In the event of a predetermined temperature condition column 9, line 72, and column 10, line 48, for "proving", each occurrence, read -- providing --.

Signed and sealed this 2nd day of March 1965.

(SEAL)
Attest:

ERNEST W. SWIDER
Attesting Officer

EDWARD J. BRENNER
Commissioner of Patents